United States Patent
Rawls

[11] Patent Number: 6,058,884
[45] Date of Patent: May 9, 2000

[54] AQUARIUM GRAVEL SURFACE CLEANING MEANS AND APPARATUS

[76] Inventor: Anthony L. Rawls, 65 N. Fullerton Ave., #43, Montclair, N.J. 07042

[21] Appl. No.: 09/140,093

[22] Filed: Aug. 26, 1998

Related U.S. Application Data

[60] Provisional application No. 60/059,691, Sep. 20, 1997.

[51] Int. Cl.[7] .................................................. A01K 63/04
[52] U.S. Cl. ........................................ 119/259; 119/232
[58] Field of Search .................................. 119/245, 264, 119/259, 232; 210/169, 241; 15/1.7

[56] References Cited

U.S. PATENT DOCUMENTS

| | | | |
|---|---|---|---|
| 3,225,930 | 12/1965 | Willinger | 210/241 |
| 3,360,129 | 12/1967 | Powers | 210/169 |
| 3,734,853 | 5/1973 | Horvath | 210/169 |
| 4,094,788 | 6/1978 | Dockery | 210/169 |
| 4,233,702 | 11/1980 | Zweifel | 15/1.7 |
| 4,610,784 | 9/1986 | Reyniers | 210/169 |
| 4,722,670 | 2/1988 | Zweifel | 417/181 |
| 4,725,353 | 2/1988 | Whitman | 210/169 |
| 5,048,140 | 9/1991 | Wu | 15/1.7 |
| 5,655,245 | 8/1997 | Bunch | 15/1.7 |
| 5,695,654 | 12/1997 | Schultz | 210/780 |

*Primary Examiner*—Peter M. Poon
*Assistant Examiner*—Francis T. Palo

[57] ABSTRACT

The present invention is directed toward removing debris and impurities from the surface of aquarium gravel. The method comprises the utilization of a gravel casing, a pump and a filter, all interconnected. When the casing is held firmly against the floor the aquarium during operation, water enters into the casing by way of one or more apertures on the casing's wall. Gravel within the casing is thus churned with such velocity as to promote distinct patterns of water and gravel rotational motion which when sustained act upon the surface of the gravel particle.

2 Claims, 3 Drawing Sheets

AQUARIUM GRAVEL SURFACE CLEANING MEANS AND APPARATUS

This application is a continuation of Provisional Patent Application, titled: Aquarium Gravel Surface Cleaning Means and Apparatus, Ser. No. 60/059,691, filed Sep. 20, 1997.

FIELD OF THE INVENTION

The present invention is directed to a method and apparatus for use in removing debris which has settled within aquarium gravel as well as for removing algae and other minute deposits which have adhered to the surface of aquarium gravel.

BACKGROUND PRIOR ART

Aquariums of the type for use in containing tropical fish commonly include a layer of gravel which lines the floor of the tank. This gravel is used as a way of beautifying the aquarium, but it also has some practical purposes. It frequently serves as the foundation in which aquatic plants take root. It also serves as a colonizing area for nitrifying bacteria necessary for the conversion of fish wastes into harmless ammonia nitrates. Unfortunately, aquarium gravel can also be a major source of aquarium pollution and fish diseases, unless it is cleaned regularly. Fish wastes and uneaten food can accumulate deep within the gravel bed. Algae and other fine deposits may bond to the surface of aquarium gravel. Harmful bacteria and fish parasites may do the same. A need is apparent therefore for an effective method for removing aquarium wastes embedded within the gravel as well as on its surface.

A great deal of effort and energy has been devoted to cleaning aquarium gravel, since this is so crucial to maintaining good aquarium water quality. Prior art in cleaning aquarium aggregate is shown in a number of patents, including the following: Reyniers U.S. Pat. No. 4,610,784, the Whitman U.S. Pat. No. 4,725,353, and the Schultz U.S. Pat. No. 5,695,654.

Each of these inventions includes a gravel agitation feature. Agitation of aquarium gravel is essential for loosening debris which may be buried deep within the gravel bed. Not until the debris is separated from the gravel, can the initial phase of the gravel cleaning processes demonstrated in all of these inventions begin.

In Reyniers, gravel agitation is incorporated into the aquarium draining process through the utilization of the Venturi principle. A flexible hose is provided having opposite ends, where one end is connected to one end of a larger diameter tube. The other end of the tube is placed adjacent the gravel covering the aquarium floor. A valve and a fitting provide means for connection to the end of a faucet that contains a venturi section. When the faucet is turned on, one position of the valve causes the water running out of the faucet to draw water from the aquarium for discharge into the drain below the faucet. The outward flow of water from the gravel tube, through the flexible hose, and into the drain, is sufficient to lift some of the gravel into the tube when it is placed almost fully in contact with the gravel. But this form of syphoning action creates a relatively slow water velocity leaving the gravel tube. This rate of water flow outward from the aquarium is sufficient to carry some fish wastes embedded within gravel, but not all of it, because the outward water flow does not stimulate sufficient gravel agitation to promote the degree of gravel to gravel surface contact required for a more thorough form of gravel cleansing.

The Schultz patent takes a different approach to gravel agitation. It is reportedly the result of tests which show that separating sediment and impurities from the gravel must take place totally outside the gravel tube and in the presence of an uninterrupted flow of water up through the discharge hose. Therefore, to accomplish gravel agitation, Schultz's method includes the utilization of a frame-supported, tooth-shaped grille that has formed therein a plurality of openings to allow passage of water, sediment and impurities into the discharge hose, but not the gravel. This tooth-shaped grille, in turn, is used by the operator to manually "manipulate" the gravel about the floor of the aquarium, or cause the gravel particles to "bump and grind" against each other as a means of loosening debris imbedded within the gravel so that the debris when loosened is thereby drawn into the openings of the tooth-shaped grille and through the discharge hose before terminating into the drain.

Unfortunately, this method of gravel agitation presents its own problems. Once again, like the Reyniers method, it too incorporates the use of the Venturi principle in the aquarium draining process as a means of cleaning aquarium gravel. Granted, the Schultz method is not designed to agitate gravel by way of draining the aquarium, but it does depend on the draining process to carry fish wastes out of the tank once these wastes have been stirred up by the operator of the tooth-shaped grille. For example, in order to agitate debris-laden gravel at the bottom of an aquarium gravel bed with a depth of three or more inches, the operator of the tooth-shaped grille has a choice of either using the device to sweep away the top layers of gravel, or use the device to plow down deep inside the bed. The plowing, digging, and raking of gravel with the toothshaped grille has the potential for creating considerable cloudiness in the aquarium and thereby disturbing the inhabitants with organic pollutants, especially in aquariums that are not regularly cleaned. For best results in using this apparatus, one must exercise extreme care and patience in manipulating the grille in order to do a thorough job of cleaning the gravel while not violating the twenty-percent water volume change rule. To accomplish this feat requires traits that are not always present in those who care for aquariums.

Both Reyniers and Schultz utilize aquarium gravel cleaning approaches that wastes considerable amounts of water, since they incorporate the use of a water faucet pump which requires water flow from a faucet in order to drain the aquarium tank and thereby provide means for cleaning aquarium gravel. In fact, some pet store owners prohibit their employees from cleaning their aquariums this way because of the high water bills which may be generated in a commercial setting by using the Reyniers and Schultz's methods of aquarium gravel cleaning.

The Whitman method appears to be the closest prior art, at least in principle. It is characterized by the use of an opened bottom casing for selectively defining the boundary of a portion of gravel that is to be cleaned, and where water is pumped into the casing to achieve agitation and to dislodge and removed unwanted settled debris. A water recirculating arrangement that includes a pump, a filter, and a water discharge system within the casing is provided. The water discharge system within the casing is characterized by stationary water jets extending into the gravel at each of four corners for the purpose of gravel agitation; a rotatable member driven by water flow passing through angled outlet jets serves added agitation and dislodging purposes.

The Whitman approach differs from Reyniers and Schultz in that it does not incorporate an aquarium draining process into the process of gravel agitation or debris removal.

Instead Whitman uses a pump to introduce water into the gravel casing via water jets, both rotatable and fixed, for the purpose of creating a predetermined rate of water velocity leaving the jets and thereby effectuating gravel agitation within the gravel casing. A water recirculating and filtering system acts on the same principle as ordinary aquarium power filters: utilization of pumped-induced drawing action to pull water through a filtering media and then return it to the aquarium from which it originally came.

Whitman's method of gravel agitation introduces sufficient water velocity into the gravel casing to effectively dislodge impurities embedded within the gravel without the need to incorporate an aquarium draining process into gravel agitation or gravel cleaning, like the Reyniers and Schultz inventions. While periodic aquarium draining and subsequent refilling are important as a means of diluting potentially harmful dissolved or liquid wastes, aquarium draining need not occur simultaneously as aquarium gravel agitation and cleaning. In fact, to assure water conservation and avoid violating the twenty percent aquarium water volume change rule, the draining and refilling processes should be conducted independently of the gravel agitation or gravel cleaning. There are a number of aquarium draining and refilling devices which simplify this task and are currently available through pet store dealers, or they can easily be made through the use of a single hose for syphoning water from the aquarium and using that same hose to refill the tank.

While the Whitman method offers a more focused approach toward thorough gravel agitation and cleaning than the Reyniers and Schultz methods, it does not promote the use of gravel to gravel surface contact as a means of cleaning the surface of the gravel particle. Instead, the Whitman method, with its complicated arrangement of stationary water jets extending into the gravel at each of four corners within the gravel casing and a rotatable member driven by water flow passing through angled outlet jets, merely agitates gravel for the purpose of dislodging and removing unwanted debris and impurities which have settled on top or within the gravel bed. It is not designed to harness the effective use of gravel as a means of cleansing itself. I will demonstrated how my invention utilizes this power in a far less complicated approach and why it is therefore more effective for thorough gravel particle cleansing.

Attention is also directly to the following: U.S. Pat. Nos. 4,233,702 and 4,094,788.

SUMMARY OF THE INVENTION

The present invention provides a method for removing sediments which have settled within aquarium gravel and also for removing substances such as algae that have adhered to the surface of aquarium gravel. More particularly, the invention includes a gravel casing with an opening at the top for fluid communication with a water pump. The casing also has an opened bottom whose diameter is significantly larger than the opening at the top of the gravel casing. The gravel casing is characterized by one or more apertures or openings on the casing's wall. In addition to the casing, the apparatus of the invention also includes a pump, a filter, and both rigid and flexible hose or tubing, all interconnected by conduit means. Pump-induced suction force pulls water surrounding the gravel casing into the gravel casing's interior boundary primarily through one or more apertures located on the gravel casing exterior wall, in the preferred embodiment of the invention. Water that manages to enter from the gravel casing's opened bottom is purposefully restricted when the gravel casing's opened bottom sits flat and firmly against the floor of the aquarium. Agitation of gravel within the gravel casing is thereby principally the result of water introduced into the gravel casing through one or more apertures in the gravel casing wall, in the preferred embodiment of the invention. The velocity of the water entering the gravel casing through one or more apertures on the gravel casing wall is predetermined by a plurality of variables that include the size, location and shape of the apertures in the gravel casing wall, as well as the number of gravel casing wall apertures, the pumping capacity of the pump, as well as the diameter and height of the gravel casing. Since the intensity of gravel to gravel surface contact is based in part on the velocity of water entering the gravel casing through one or more apertures on the gravel casing circular wall, increased intensity and frequency of gravel to gravel surface contact can be achieved by manipulating a plurality of variables, including those just described.

The following description and black and white photographs are designed to promote a better understanding of the present invention. However, they should by no means be interpreted as limiting the scope of the invention, since further alterations or modifications would be expected to occur to one skilled in the art to which this invention applies.

FIG. 1 is a full frontal view of the invention, showing the components of the aquarium gravel cleaning apparatus, And, FIG. 2 is a closer view of the molded plastic casing illustrated in FIG. 1, And, FIG. 3 is an even closer view of the molded plastic casing illustrated in FIG. 1 and FIG. 2,

REFERENCE NUMERALS IN PHOTOGRAPHS 12 pump
12a pump inlet
12b pump outlet
14 pump housing
16 flexible hose joined to pump inlet (12a)
16a flexible hose joined to pump outlet (12b)
18 gravel casing
18a gravel casing sieve or screen
18b gravel casing circular weight
18c gravel casing wall aperture or opening
18d gravel casing wall aperture or opening
18e gravel casing exterior wall
20 filter
20a filter's suction cups
20b filtering media
20c coupling [between filter (20) and flexible hose (16)]
22 aquarium gravel
24 aquarium
24a aquarium exterior wall
24b aquarium interior wall
24c aquarium floor
26 rigid tubing or gravel cleaner handle
28 coupling between gravel casing and gravel casing handle

DESCRIPTION OF A PREFERRED EMBODIMENT

Figure 1:
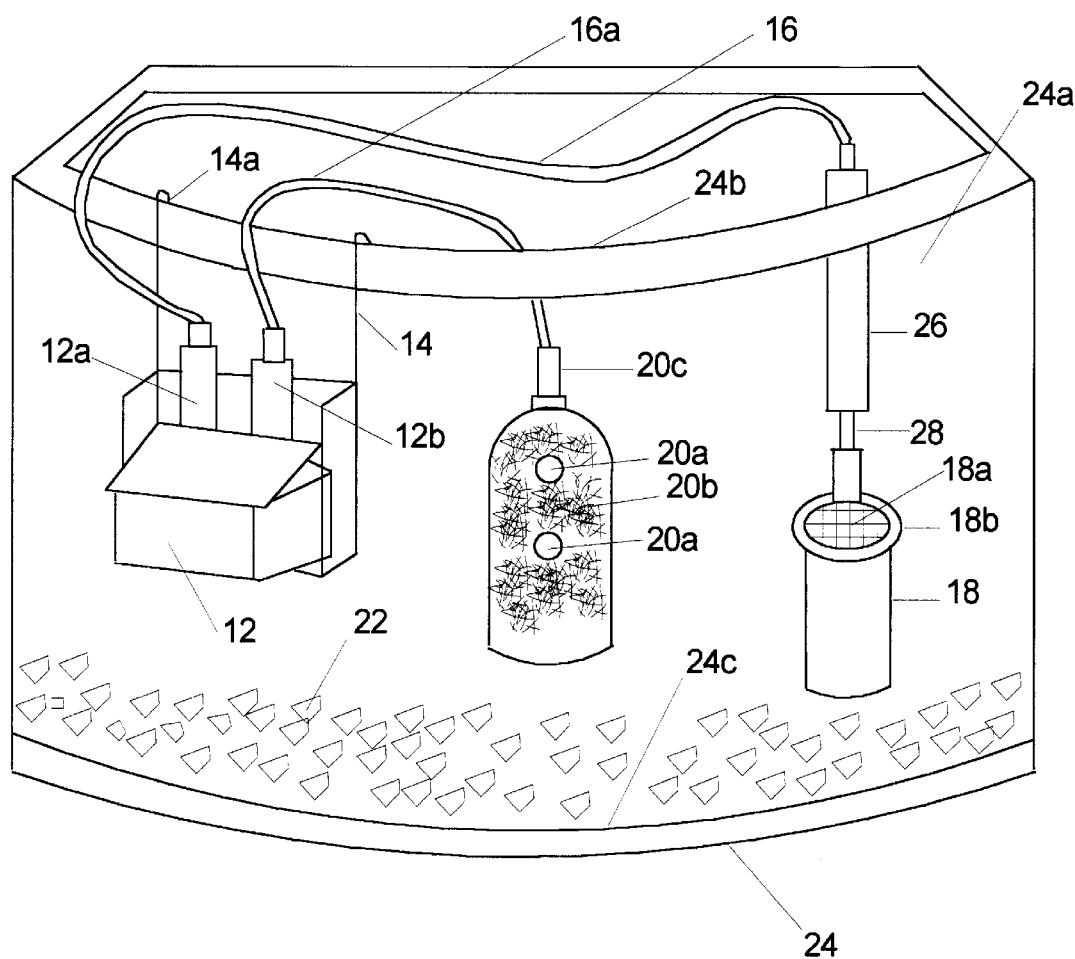

Referring now to FIG. 1, the aquarium gravel 22 cleaning apparatus comprises a pump 12 which is encased in a housing. The pump 12 has been encased for both aesthetic and operational purposes. The housing provides a means for maintaining an upright position of the two flexible conduits 16 leading directly from the pumps inlet 12a and outlet 12b ports. This allows easier pump 12 priming at the start of the gravel 22 cleaning process.

The housing is connected to an all-steel constructed frame 14, made from a beverage can dispenser. The frame 14 provides stable support for the housing. It also serves an a means of moving the pump 12 readily from one location to another during the course of gravel cleaning. This is achieved by the frame's hook 14a which permits the housing to hang on the outside wall 24a of the aquarium tank 24.

The pump's inlet port 12a is connected by flexible conduit means 16 to a molded plastic bottle-shaped gravel casing 18 with an opened bottom. The pump's fluid outlet 12b is connected by flexible conduit means 16a to a submersible molded plastic bottle-shaped filter with an opened bottom 20. The filter 20 is held in a stationary position against the interior wall 24b of the aquarium tank 24 by the filter's suction cups 20a.

The aquarium gravel cleaning process begins when the gravel casing 18 along with the rigid plastic tubing 26 which serves as its handle are submerged into the aquarium 24. A syphon (not shown) communicating with the bottom portion of a coupling 20c which interconnects the pump's outlet port 12b with the submersible filter 20 is used to draw air out of the pump 12 and create a vacuum for the purpose of pulling water from the aquarium 24 through the gravel casing 18, the rigid plastic tubing 26 or handle of the gravel casing 18, and the flexible conduit 16 and finally into the pump 12 inlet port 12a. With the pump 12 now fully primed, the flexible conduit 16a leading from the pump's 12 outlet port 12b is now connected by conduit means to the submerged filter 20, held against the aquarium's 24 interior wall 24b by the filter's 20 one or more suction cups 20a as illustrated in FIG. 1, depicting the apparatus as it appears during operation.

The submerged gravel casing 18 is now placed over gravel 22 on the aquarium floor 24c, held in a vertical position, and pressed downward into the gravel 22 so that its circular base surrounds the portion of gravel 22 selected for cleaning. This process is facilitated by a rigid plastic tubing conduit 26, which also serves as a handle for the gravel casing 18. One of the opposite ends of the rigid plastic tubing 26 is connected to the upper end of a coupling 28 whose lower end is connected to the upper end of the gravel casing 18.

Pump-induced suction introduces water into the gravel casing 18 and pulls water from the casing 18 and into the flexible conduit 16 leading to the pump's inlet 12a. Loose wastes which have settled on top of the gravel 22 contained in the casing 18 are thus sucked out and carried away. Pump-induced gravel 22 agitation within the casing 18 further separates and loosens wastes and debris buried below the surface of the gravel 22 bed, so that they too can be sucked out and carried away. Sediments which have been loosened by pump-induced gravel 22 agitation are drawn with water into the filter 20 where they are separated from the water by filtering media 20b. The water then returns back into the aquarium 24 at the base of the filter 20, having been cleansed of the settled sediments. This step is repeated, i.e., the gravel casing 18 is lifted from the cleansed gravel 22 and placed over another area of gravel 22 selected for cleaning. The force of the pump-induced suction action is not sufficient to hold onto the cleansed gravel 22 once the gravel casing 18 has been lifted. The gravel 22 therefore falls back to the aquarium floor 24c.

A plastic screen 18a at the upper interior of the gravel casing 18 prevents gravel 22 from entering the rigid conduit 26. A circular weight 18b, made of flexible tubing filled with aquarium gravel 22, helps maintain the gravel casing 18 in a vertical position when it is moved from one area of gravel 22 cleaning to another, thereby reducing the amount of time and energy needed to complete the desired cleaning process.

The steps involved in removing substances which have adhered to the surface of aquarium gravel 22 particles are similar to those steps just outlined. However, since this is a more thorough form of gravel 22 cleaning, an additional step is required. During the gravel 22 surface cleaning process, for example, as the operator places the gravel casing 18 over an area of gravel 22 selected for cleaning, and as the operator uses sufficient downward pressure on the upper portion of the rigid tubing 26 or handle leading from the top of the gravel casing 18 the operator also twists the handle or rigid tubing 26, forcing the gravel casing 18 to work its way through the underlying gravel particles 22 and toward direct contact with the aquarium floor 24c. As it does, the vacuuming force of the pump 12 will pull the base of the gravel casing 18 to the aquarium floor 24c and hold it there. This engages the sustained drawing force or vacuuming action needed for gravel surface cleaning.

Figure 2:
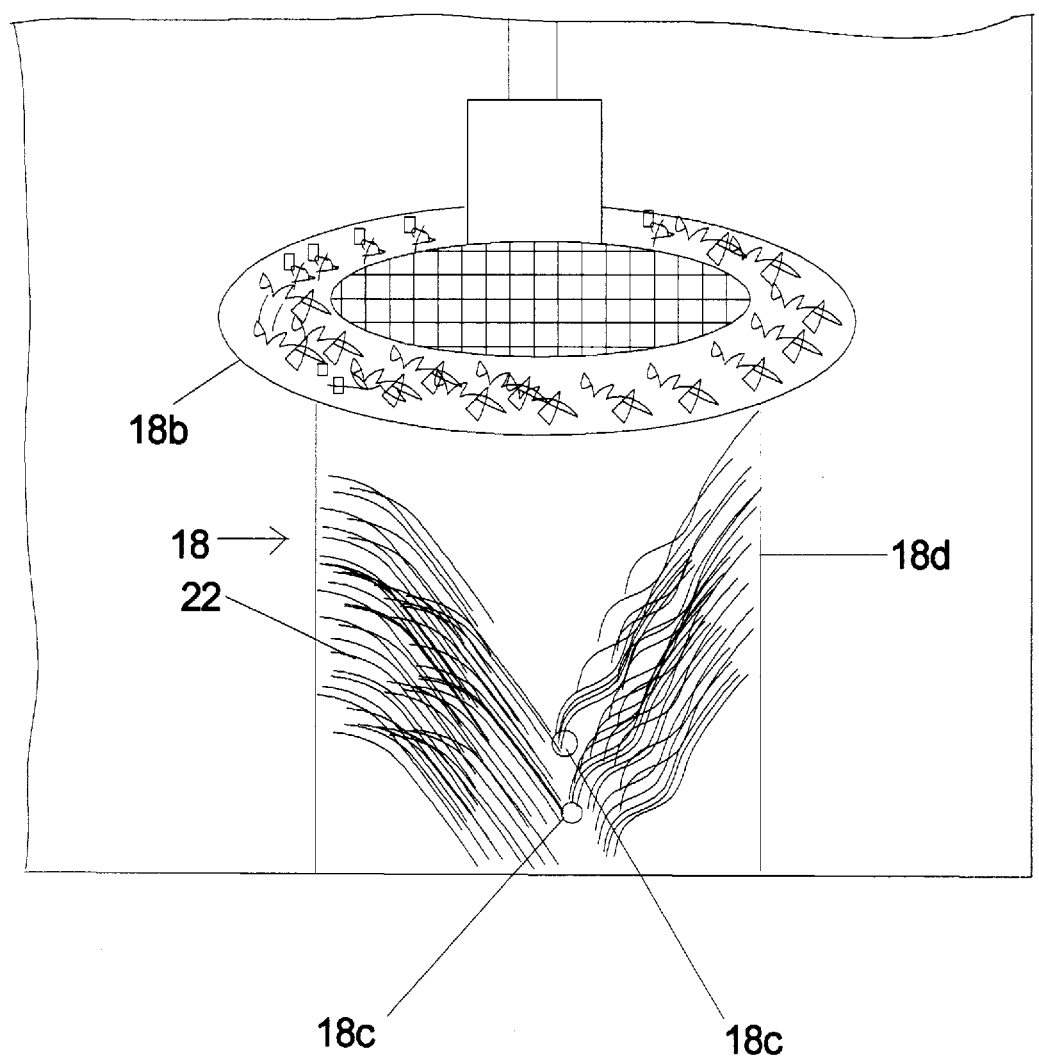

Referring now to FIG. 2, gravel rotational motion is achieved by the use of one or more apertures 18c and 18d located in the gravel casing 18 circular wall 18e. Water introduced into the gravel casing 18 through the aperture 18c and 18d causes rotational motion of water within the gravel casing 18 and the gravel 22 within the gravel casing 18 as a result of pump-induced drawing action. The velocity of pump-induced gravel rotational motion and the pattern or shape of the whirling movement of water and gravel 22 within the gravel casing 18 can be manipulated in several ways. The number of apertures 18c and 18d located in the gravel casing wall 18e, the size of the apertures 18c and 18d, their shape, their location on the gravel casing wall 18e, as well as the amount of gravel 22 held within the gravel casing 18, and the combinations of these, as well as other variables directly impact the velocity of water and gravel 22 rotational motion as well as the sustained pattern or shape of the whirling movement of water and gravel 22 within the gravel casing 18.

The gravel rotational motion illustrated is angular and formed at the apertures 18c and 18d located on the casing wall 18e because of the force of incoming water.

Figure 3:
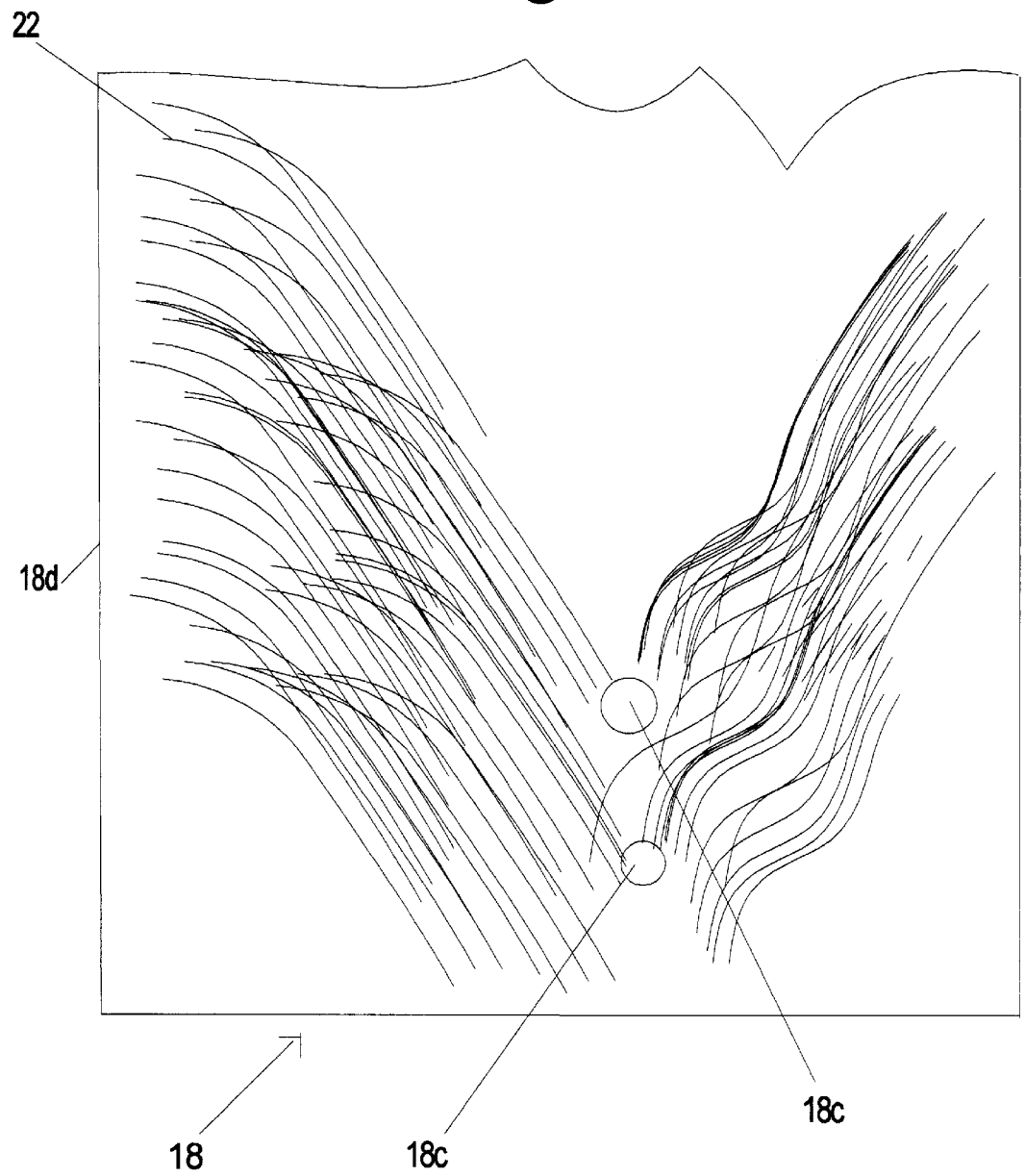

Referring now to FIG. 3, the pattern of gravel 22 rotational motion is more distinct. Gravel 22 to gravel 22 surface contact is collisional at the aperture 18c and 18d or the point of incoming introduced water. Sustained collisional gravel 22 to gravel 22 surface contact under these conditions has an impact on the surface of the gravel 22 particles that can be demonstrated when colored gravel is used. Gravel 22 colored with a blue coating, for example, will begin to turn white, as a result of sustained collisional gravel 22 to gravel 22 surface contact. The ability of the invention to remove the colored coating from colored gravel is one way of demonstrating that the invention provides means for removing substances which bond to the gravel's 22 surface.

The force of the incoming water through one or more apertures 18c and 18d is also effected by the amount of water that manages to enter the casing 18 from the bottom of the aquarium floor 24c. The base edges of the circular casing wall 18e therefore must be uniformly even so that the casing 18 sits flat against the aquarium floor 24c, thereby limiting the amount of water that manages to enter the casing 18 from its base. This helps to maximize the force of water introduced into the gravel casing 18 through one or more apertures 18c and 18d located in the gravel casing's wall 18e. It also creates additional pump-induced suction or vacuuming force within the gravel casing 18. The increased suction force causes the base of the gravel casing 18 to hold itself firmly against the aquarium floor 24c. After a predetermined amount of time required for the desired level of gravel surface cleaning, the operator simply tilts the handle of the gravel casing 18 to unlock the pump-induced vacuuming bond between the base of the gravel casing 22 and the aquarium floor 24c, and then lifts the gravel casing 18 from the cleansed gravel, and places it over another area of gravel selected for cleaning.

OTHER EMBODIMENTS OF THE INVENTION

In another embodiment of the invention, the base of the gravel casing's 18 circular wall 18e has one or more openings formed in its bottom edge where it meets in direct contact with the aquarium floor 24c. The size, shape, location, and number of these openings are predetermined as a means of manipulating a plurality of factors, including the velocity of incoming introduced water at the base of the gravel casing 18, the amount of incoming introduced water at the base of the gravel casing 18, and the rotational pattern of the incoming water once it has been introduced into the gravel casing 18 via its base. In other words the gravel casing's 18 base is purposefully designed to prevent it from sitting in watertight alignment with the aquarium floor 24c, as described in the preferred embodiment of the invention. Instead, gravel agitation is achieved by pump-induced vacuuming force which introduces water traveling at a predetermined velocity into the gravel casing 18 at its base where it meets in direct contact with the aquarium floor 24c. The base edges therefore are purposefully designed to allow limited water passage therethrough sufficient enough to promote gravel agitation when the base of the gravel casing 18 is held against the aquarium floor 24c.

In still another embodiment of the invention a combination of one or more openings or apertures 18c and 18d in the gravel casing circular wall 18e as well as its base as just earlier described are the primary means of water entry into the gravel casing 18 for the purpose of gravel 22 agitation and cleaning.

In another embodiment of the invention, the pump 12 is submerged in the aquarium 24, thereby eliminating the need for pump 12 priming as an additional step in the gravel cleaning process.

In another embodiment of the invention, the rigid tube 26 which serves as the gravel casing 18 handle 26 is replaced by flexible tubing such that the gravel casing's 18 top or its northern most point serves as its handle.

In another embodiment of the invention, the gravel casing 18 and the rigid tube 26 which serves as its handle are one monolithic unit of a predetermined height and width.

I claim:

1. In an aquarium environment, a cleaning apparatus, with means for:

removing unwanted matter that bonds to the surface of aquarium gravel particles;

removing unwanted matter that gravitates on the surface of the aquarium gravel bed;

removing unwanted matter buried beneath the aquarium gravel bed;

removing unwanted matter that is suspended in the aquarium water, and comprising:

a gravel casing with means for:

liquid communicating aquarium water located outside of said gravel casing with aquarium water located in the interior boundary of said gravel casing;

surrounding an area of gravel for cleaning;

housing an area of gravel for cleaning;

promoting a distinct pattern of gravel and water rotational movement;

promoting the use of gravel to clean itself;

vacuuming aquarium gravel; and further comprising:

a rigid tube with means for liquid communicating said aquarium water located in the interior boundary of said gravel casing with said rigid tube;

a flexible hose with means for liquid communicating said aquarium water located within said rigid tube with said flexible hose;

a pump with means for liquid communicating said aquarium water located within said flexible hose with said pump;

another flexible hose with means for liquid communicating aquarium water located within said pump with said other flexible hose;

a filter with means for liquid communicating said aquarium water located within said other flexible hose with said filter;

and couplings with means for:

interconnecting said gravel casing with said rigid tube;

interconnecting said rigid tube with said flexible hose;

interconnecting said flexible hose with said pump;

interconnecting said pump with said other flexible hose;

interconnecting said other flexible hose with said filter.

2. The invention as defined in claim 1, wherein, said means for, removing unwanted matter that bonds to the surface of aquarium gravel particles;

removing unwanted matter that gravitates on the surface of the aquarium gravel bed;

removing unwanted matter buried beneath the aquarium gravel bed; includes two openings on said gravel casing's wall which serve as the primary entry point of aquarium water entry when said gravel casing is held firmly against the floor of the aquarium such that it defines an area of gravel selected for cleaning thereby resulting in aquarium water under pump-induced vacuuming force to, enter said gravel casing interior boundary that houses an area of gravel selected for cleaning;

agitate gravel and water located in the interior boundary of said gravel casing;

draw out impurities buried on top of gravel located in the interior boundary of said gravel casing;

draw out impurities buried beneath the surface of gravel located in the interior boundary of said gravel casing;

cause distinct patterns of gravel and water rotational motion which promote gravel to gravel surface contact cleaning;

carry impurites separated from gravel to a filter for filtration.

* * * * *